United States Patent
Lee et al.

(10) Patent No.: US 10,158,714 B2
(45) Date of Patent: Dec. 18, 2018

(54) APPARATUS AND METHOD FOR ZONE MANAGEMENT

(71) Applicant: Samsung Electronics Co., Ltd., Suwon-si, Gyeonggi-do (KR)

(72) Inventors: Yong-Oh Lee, Seoul (KR); Hyun-Suk Min, Suwon-si (KR); Sang-Sun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 621 days.

(21) Appl. No.: 14/817,812

(22) Filed: Aug. 4, 2015

(65) Prior Publication Data
US 2016/0044111 A1 Feb. 11, 2016

(30) Foreign Application Priority Data
Aug. 5, 2014 (KR) .................. 10-2014-0100358

(51) Int. Cl.
*G01K 13/00* (2006.01)
*H04L 29/08* (2006.01)
(Continued)

(52) U.S. Cl.
CPC .............. *H04L 67/12* (2013.01); *G01K 13/00* (2013.01); *G01K 17/20* (2013.01); *H04W 4/005* (2013.01);
(Continued)

(58) Field of Classification Search
CPC ........ H04W 4/70; H04W 4/005; G01K 13/00; G01K 17/20; H04L 67/12; Y02D 70/00; Y02B 60/50
See application file for complete search history.

(56) References Cited

U.S. PATENT DOCUMENTS 6,868,399 B1 3/2005 Short et al.
8,155,900 B1 4/2012 Adams
(Continued)

FOREIGN PATENT DOCUMENTS

KR 10-2012-0126779 A 11/2012
KR 10-2013-0010694 A 1/2013
(Continued)

OTHER PUBLICATIONS

Leaders in the Hospitality Industry Tap the Power of Superior Energy Management., Environmental Leadership Adds Value to Your Bottom Line and Corporate Reputation, Jul. 2004, Environmental Protection Agency, USA.
(Continued)

*Primary Examiner* — Mischita Henson
(74) *Attorney, Agent, or Firm* — Jefferson IP Law, LLP

(57) ABSTRACT

The present disclosure relates to a sensor network, machine type communication (MTC), machine-to-machine (M2M) communication, and technology for Internet of things (IoT). The present disclosure may be applied to intelligent services based on the above technologies, such as smart home, smart building, smart city, smart car, connected car, health care, digital education, smart retail, security and safety services. An apparatus for zone management is provided. The apparatus includes a processor configured to collect environment information of each zone of a plurality of zones, and determine an energy efficiency level of each zone of the plurality of zones based on the environment information.

31 Claims, 13 Drawing Sheets

(51) Int. Cl.
   *G01K 17/20*   (2006.01)
   *H04W 4/70*    (2018.01)
   *H04W 4/00*    (2018.01)

(52) U.S. Cl.
   CPC .............. *H04W 4/70* (2018.02); *Y02B 60/50* (2013.01); *Y02D 70/00* (2018.01)

(56) References Cited

U.S. PATENT DOCUMENTS

| | | | |
|---|---|---|---|
| 8,369,994 | B1 | 2/2013 | Rosen |
| 2004/0059815 | A1 | 3/2004 | Buckingham et al. |
| 2008/0083834 | A1 | 4/2008 | Krebs et al. |
| 2008/0091480 | A1 | 4/2008 | Geoghegan et al. |
| 2009/0171512 | A1* | 7/2009 | Duncan ................. F24F 5/0035 700/300 |
| 2013/0204454 | A1 | 8/2013 | Choi et al. |
| 2013/0226320 | A1* | 8/2013 | Berg-Sonne ........... G05B 15/02 700/90 |
| 2013/0318217 | A1* | 11/2013 | Imes ..................... F24F 11/006 709/221 |
| 2015/0045966 | A1* | 2/2015 | Chen ..................... G05B 13/042 700/277 |

FOREIGN PATENT DOCUMENTS

| | | |
|---|---|---|
| KR | 10-2013-0035577 A | 4/2013 |
| KR | 10-2013-0089798 A | 8/2013 |

OTHER PUBLICATIONS

Recovery Time(TM) Technology, EcoSmart(TM) Intelligent Energy Management, 2014, Rev. 2, Telkonet, Inc., Waukesha,WI, USA.

Micros Systems, Room Assignment, Opera Property Management System, opera.mantiscollection.com/OperaHelp/room_blocking.htm.

Saving Energy Dollars in Hotels, Motels and Restaurants, Energy Innovators Initiative, Hospitality Sector, 2003, The Office of Energy Efficiency of Natural Resources Canada, Ottawa, CN, CA.

* cited by examiner

| NO | CLASS | STATUS | VACANCY | RESERVATION | FLOOR | REMARKS | ENERGY EFFICIENCY LEVEL |
|---|---|---|---|---|---|---|---|
| 101 | DELUXE | DIRTY | OCCUPIED | AVAILABLE | 3 | ... | Lv1 |
| 501 | DELUXE | INSPECT | OCCUPIED | AVAILABLE | 5 | ... | Lv2 |
| 301 | DELUXE | DIRTY | AVAILABLE | AVAILABLE | 3 | ... | Lv3 |
| 401 | DELUXE | INSPECT | OCCUPIED | | 4 | ... | Lv3 |
| 201 | DELUXE | DIRTY | AVAILABLE | AVAILABLE | 2 | ... | Lv2 |
| 102 | DELUXE | INSPECT | OCCUPIED | | 1 | ... | Lv5 |
| 104 | DELUXE | CLEAN | AVAILABLE | AVAILABLE | 1 | ... | Lv2 |
| 105 | DELUXE | CLEAN | OCCUPIED | | 1 | ... | Lv4 |

| Room | EE level |
|---|---|
| 101 | 3 |
| 102 | 2 |
| 201 | 2 |
| 202 | 1 |
| 301 | 5 |
| 302 | 1 |
| 401 | 1 |
| 402 | 2 |
| 501 | 5 |
| 502 | 3 |
| 601 | 1 |
| 602 | 4 |
| 701 | 1 |
| 702 | 1 |
| 801 | 3 |
| 802 | 4 |
| 901 | 5 |
| 902 | 4 |
| 1001 | 4 |
| 1002 | 1 |

FIG.9B

| Room | EE level |
|---|---|
| 202 | 1 |
| 302 | 1 |
| 401 | 1 |
| 601 | 1 |
| 701 | 1 |
| 702 | 1 |
| 1002 | 1 |
| 102 | 2 |
| 201 | 2 |
| 402 | 2 |
| 101 | 3 |
| 502 | 3 |
| 801 | 3 |
| 602 | 4 |
| 802 | 4 |
| 902 | 4 |
| 1001 | 4 |
| 301 | 5 |
| 501 | 5 |
| 901 | 5 |

FIG.9C

| Room | EE level |
|---|---|
| 202 | 1 |
| 302 | 1 |
| 401 | 1 |
| 601 | 1 |
| 701 | 1 |
| 702 | 1 |
| 1002 | 1 |
| 102 | 2 |
| 201 | 2 |
| 402 | 2 |
| 101 | 3 |
| 502 | 3 |
| 801 | 3 |

FIG.9D

TOURIST GUEST ↑ ... ↑ BUSINESS GUEST

| Room | EE level |
|---|---|
| 202 | 1 |
| 302 | 1 |
| 401 | 1 |
| 601 | 1 |
| 701 | 1 |
| 702 | 1 |
| 1002 | 1 |
| 102 | 2 |
| 201 | 2 |
| 402 | 2 |
| 101 | 3 |
| 502 | 3 |
| 801 | 3 |

# APPARATUS AND METHOD FOR ZONE MANAGEMENT

CROSS-REFERENCE TO RELATED APPLICATION(S)

This application claims the benefit under 35 U.S.C. § 119(a) of a Korean patent application filed on Aug. 5, 2014 in the Korean Intellectual Property Office and assigned Serial number 10-2014-0100358, the entire disclosure of which is hereby incorporated by reference.

TECHNICAL FIELD

The present disclosure relates to a method and an apparatus for zone management.

BACKGROUND

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

A present-day service industry is gradually growing on a large scale. In the large-scale service business, it is economically inefficient to assign zones to a plurality of users at random or arbitrarily in an accommodation facility such as a hotel or hospital. Accordingly, it is advantageous to assign the zone to the user according to a condition of the user or the facility. However, it is quite cumbersome and requires much time to assign the room one by one in the large-scale facility by taking into account as many conditions as possible. Hence, it is required to adopt a zone assignment system and to assign the zone corresponding to demands of the user and a manager by considering as many conditions as possible.

For the zone assignment, the manager may use a property management system (PMS). The PMS may provide the manager with reservation information such as user name, length of stay, and required zone features collected by a reservation system, and guest preference and class information and zone status information of the PMS.

Reservation using the PMS filters available zones corresponding to reservation information or guest information and then lists the zones in a descending/ascending order based on a zone name, a zone number, or frequency of use. However, the reservation using the PMS does not consider energy efficiency. Cooling and heating energies in a zone occupy 30~50% of total energy consumption. Cooling and heating energy saving is very important in carbon dioxide emission regulations and operating expense reduction. An energy saving method of the related art reduces the cooling and heating in vacancy or focuses on efficiencies of cooling and heating system components. In this regard, what is needed is a zone assignment system using a zone managing device based on the zone energy efficiency in the PMS.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for zone assignment based on energy efficiency.

Another aspect of the present disclosure is to provide an apparatus and a method for prioritizing zone assignment based on energy efficiency.

Another aspect of the present disclosure is to provide an apparatus and a method for zone assignment based on a user characteristic.

In accordance with an aspect of the present disclosure, an apparatus for zone management is provided. The apparatus includes a processor configured to collect environment information of each zone of a plurality of zones, and determine an energy efficiency level of each zone of the plurality of zones based on the environment information.

In accordance with another aspect of the present disclosure, a method for zone management is provided. The method includes collecting environment information of each zone of a plurality of zones and determining an energy efficiency level of each zone of the plurality of zones based on the environment information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates zone information displayed by a zone managing device according to an embodiment of the present disclosure;

FIGS. 9A, 9B, 9C, and 9D illustrate zone assignments of a zone managing device based on an energy efficiency level according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a zone management technique. Hereinafter, a structure includes a building, a hotel, a hospital, and various structures. A zone encompasses accommodations and a space or a room for rent including a hotel room, a hospital room, and a cruise cabin. The zone may be partitioned by a wall for residence, office, or a specific purpose. An apparatus indicates a device for using a system of the present disclosure.

Figure 1:
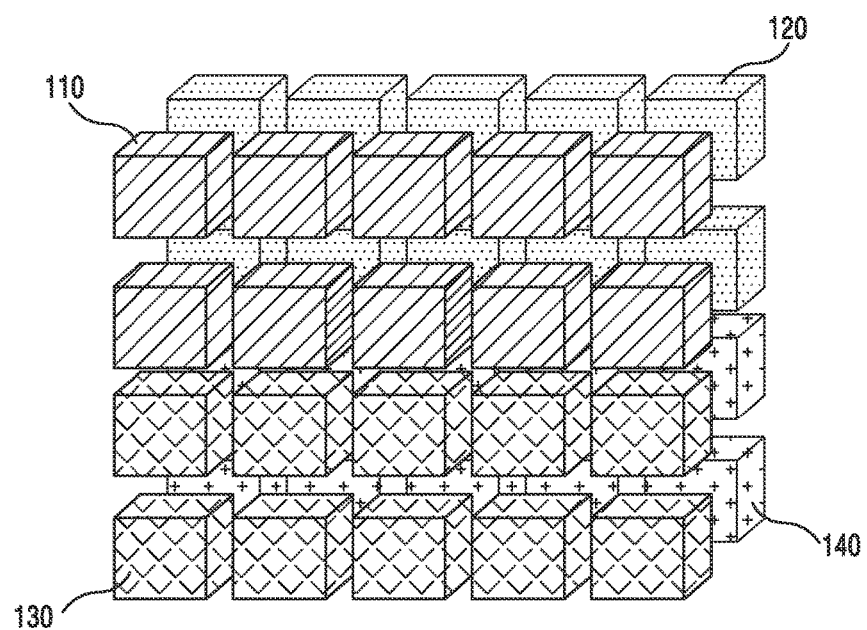
FIG. 1 illustrates energy efficiency gap based on spatial features according to an embodiment of the present disclosure.

FIG. 1 illustrates energy efficiency gap based on spatial features according to an embodiment of the present disclosure.

Referring to FIG. 1, zones 110, 120, 130 and 140 are in the same structure. Even in the same structure, the zones 110, 120, 130 and 140 may exhibit different energy efficiencies according to various spatial features such as zone location, zone floor, window direction, zone area, zone area contacting the outside, and temperature of a neighboring zone. Even in the same structure, the energy efficiency may vary according to the zone. Accordingly, when a zone managing device assigns a zone of high energy efficiency, the energy may be saved and expenses may be reduced. Hence, it is advantageous for the zone managing device to assign the zone in consideration of the energy efficiency.

Figure 2:
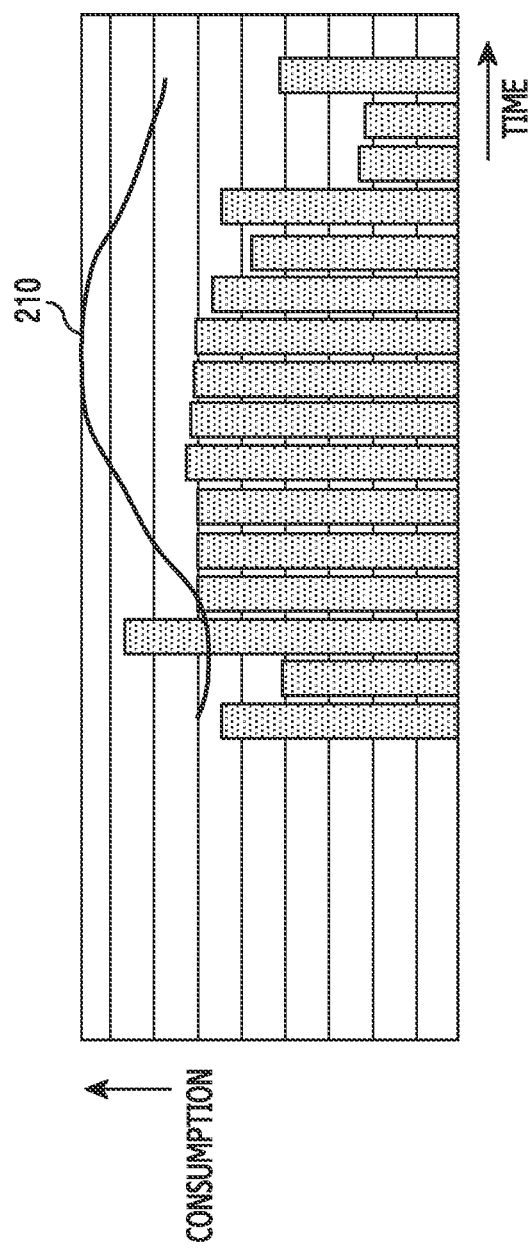
FIG. 2 illustrates an energy monitoring screen according to an embodiment of the present disclosure.

FIG. 2 illustrates an energy monitoring screen according to an embodiment of the present disclosure.

Referring to FIG. 2, the zone managing device may obtain energy information of a structure. The zone managing device may obtain the energy information of FIG. 2. In FIG. 2, a horizontal axis indicates the time, a vertical axis indicates the energy consumption, and a solid line 210 indicates an ambient temperature. The zone managing device may obtain the energy information per zone, rather than energy information of the whole structure or per floor. After obtaining the energy information, the zone managing device may assign the zones to users (e.g., user equipment) based on the energy efficiency using the energy information per zone.

Now, a plurality of zones (e.g., rooms) in the structure are assigned to users. The zones may be assigned using the zone managing device. Zone reservation and assignment of the zone managing device shall be explained in FIGS. 3 and 4.

Figure 3:
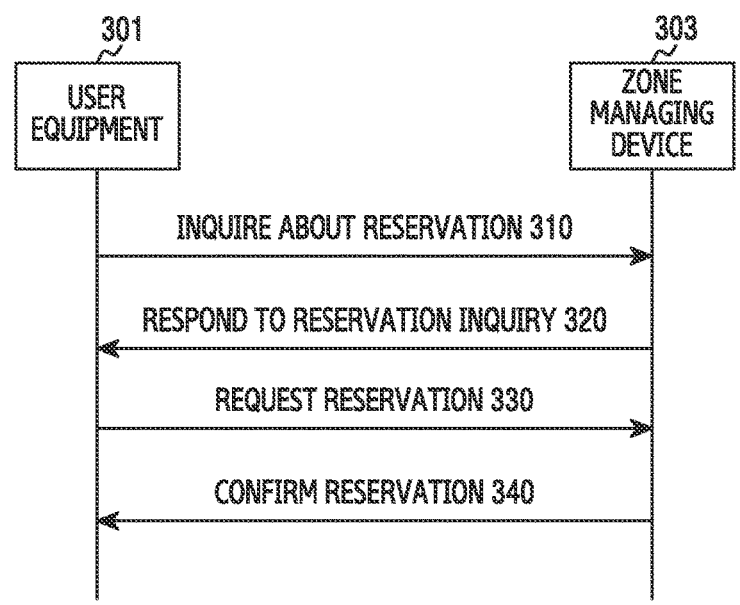
FIG. 3 illustrates zone reservation and assignment between a user equipment and a zone managing device according to an embodiment of the present disclosure.

FIG. 3 illustrates zone reservation and assignment between a user equipment and a zone managing device according to an embodiment of the present disclosure.

Referring to FIG. 3, in operation 310, the user equipment 301 inquires of the zone managing device 303 of the zone reservation online or offline. The user equipment 301 may obtain an available zone through the zone managing device 303.

In operation 320, the zone managing device 303 responds to the reservation inquiry of the user equipment 301. The reservation inquiry may be responded directly by the zone managing device 303, or responded to the user equipment 301 after the zone managing device 303 checks an available zone using another apparatus.

In operation 330, the user equipment 301 may request a reservation for the available zone based on the reservation response. The user equipment 301 may request additional reservation details, or request reservation waiting when there is no available zone.

In operation 340, the zone managing device 303 confirms the reservation of the user equipment 301. The zone managing device 303 may confirm the reservation to the user equipment 301 when the zone is available, or transmit a reservation failure message to the user equipment 301 when the zone is not available.

Figure 4:
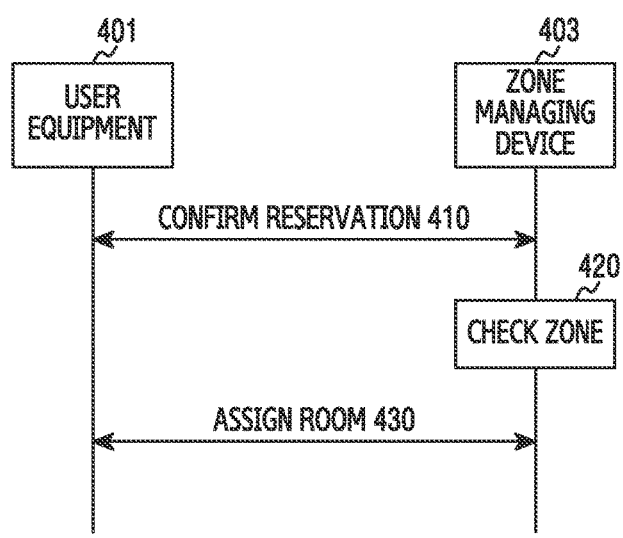
FIG. 4 illustrates zone assignment between a user equipment and a zone managing device according to an embodiment of the present disclosure.

FIG. 4 illustrates zone assignment between a user and a manager according to an embodiment of the present disclosure.

Referring to FIG. 4, in operation 410, the zone managing device 403 confirms zone assignment data of the user equipment 401. The zone assignment data may include a date of the zone assignment requested by the user equipment

401, a duration, a name, a zone type, user registration information, a priority, a group, zone features, a zone rating, notes, smoking/non-smoking, a purpose of stay, and a zone assignment agency.

In operation 420, the zone managing device 403 checks a list of available zones. When the zone managing device 403 displays the list of the available zones, the zone managing device 403 may filter the zones based on options including a room housekeeping status, a zone class, and smoking/non-smoking, and arrange the zones in an ascending or descending order based on their energy efficiency, a priority according to a preference, a zone number, and recent usage information.

In operation 430, the zone managing device 403 confirms the available zone list and then assigns the zone to the user equipment 401. Alternatively, according to settings, the zone managing device 403 may assign the zone directly to the user equipment 401 with traversing a manager.

Figure 5:
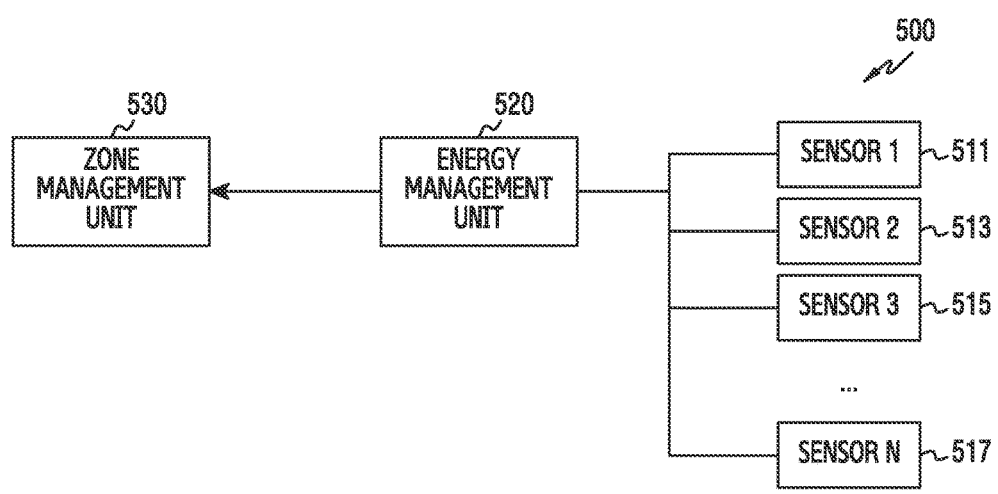
FIG. 5 illustrates a zone managing device according to an embodiment of the present disclosure.

FIG. 5 illustrates a zone managing device according to an embodiment of the present disclosure.

Referring to FIG. 5, a zone managing device 500 may include sensors 511 to 517 for the zones, an energy management unit 520, and a zone management unit 530.

The sensors 511 to 517 connected to the zones collect energy consumption information of the zones. The energy consumption information of the zones may include a set-point temperature of a thermostat, an indoor temperature, a cooling/heating temperature in each zone, a cooling/heating fan speed, and a cooling/heating time. The sensors 511 to 517 may include a temperature and humidity sensor and an air flow sensor. The air flow sensor may detect the cooling/heating temperature, the cooling/heating fan speed, and the cooling/heating time in each zone. The sensors 511 to 517 transmit the collected information to the energy management unit 520.

The energy management unit 520 calculates the energy efficiency based on the information collected from the sensors 511 to 517. The energy management unit 520 may receive the information from the sensors 511 to 517 and calculate the energy efficiency per zone. The energy efficiency per zone indicates energy consumed per unit temperature to reach the set point of the thermostat in a given zone. The less energy consumed per unit temperature, the higher energy efficiency. For example, the energy may include energy for heating ventilation and air conditioning (HVAC), and energy consumed to adjust the humidity. The energy efficiency per zone may be calculated by the energy manager using an energy efficiency function and at least one weight on the zone condition or weather information at the zone assignment.

The energy management unit 520 may obtain the energy efficiency function using regression analysis. The regression analysis acquires a result value from past data. The efficiency function may be determined from the past data of the energy applied based on a difference of the set-point temperature and the indoor temperature. The energy management unit 520 may determine the function using an incremental method. For example, the energy management unit 520 may determine the energy efficiency by weighting the most recent value for the regression analysis of the function. Hence, the energy management unit 520 may acquire the energy efficiency based on recent conditions by weighting in order of 1-day, 1-week, and 1-month. The zone consuming more energy according to the function result exhibits low energy efficiency.

The energy management unit 520 may calculate the energy efficiency using the function by applying a particular condition to the function. For example, the energy management unit 520 may define the set point based on an outdoor temperature or an indoor temperature, and calculate the energy efficiency by further considering a sunshine amount, wind direction and velocity, a temperature of a neighboring zone, and features of the structure.

The energy efficiency of the zone may vary according to the zone type. For example, the energy efficiency of a hotel may vary according to the purpose of visit, and the energy efficiency of a hospital may vary according to the number of patients in a room. The energy efficiency of a cruise ship may vary according to an infrastructural change. The infrastructure may include a sailing direction of the ship, a window direction, and a wind direction.

The energy management unit 520 transmits the energy efficiency information acquired using the function, to the zone management unit 530.

The zone management unit 530 stores reservation information and guest information in a database. The zone management unit 530 further stores zone status information including the energy efficiency information received from the energy management unit 520. The zone status information is updated on a periodic basis. The zone status information may be updated under a preset condition, for example, when the change exceeds a threshold. The zone management unit 530 may arrange the stored information in an ascending or descending order based on a particular condition, and display the arranged information through a display device. The zone management unit 530 may assign the zone based on the priority without traversing the manager according to the settings.

Figure 6:
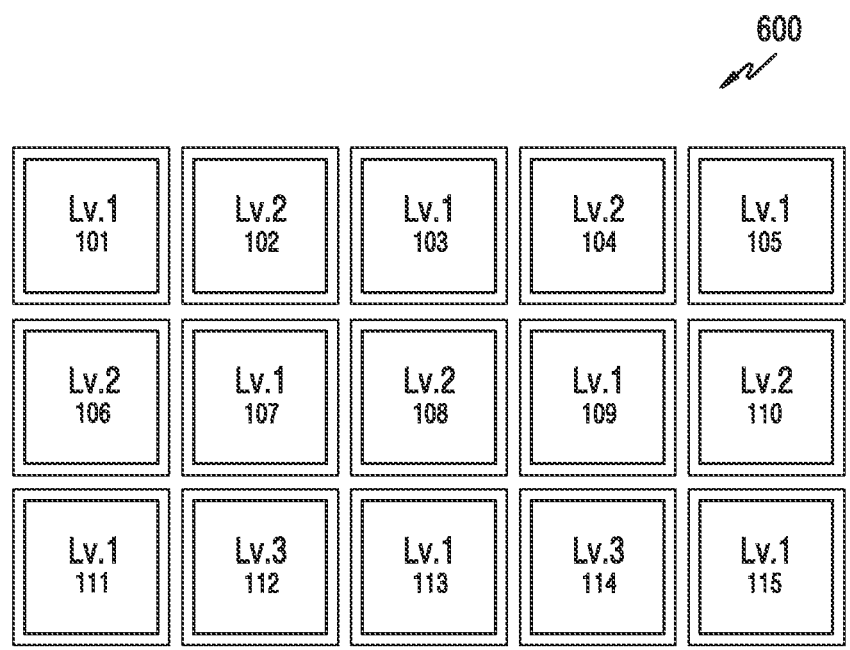
FIG. 6 illustrates a zone manager screen using a zone managing device according to an embodiment of the present disclosure.

FIG. 6 illustrates a zone manager screen using a zone managing device according to an embodiment of the present disclosure.

Referring to FIG. 6, in a zone manager screen 600, Lv denotes an energy efficiency level of the zone. The energy efficiency level may divide a criterion and a grade of sections according to manager settings. After the energy efficiency per zone is calculated, the zone managing device may arrange zones based on their energy efficiency and may determine the energy efficiency level using top % or a clustering technique of machine learning based on a preset criterion.

The zone managing device may detect and report an abnormality to the zone manager. Herein, the zone managing device may include a cooling and heating device. When updating the energy efficiency and detecting a difference between new energy efficiency and the existing energy efficiency over a threshold, the zone managing device may determine and report the abnormality to the zone manager. Herein, the report may display an alarm, display a screen, or transmit an e-mail or a text message to an engineer.

FIG. 7 illustrates zone information displayed by a zone managing device according to an embodiment of the present disclosure.

Referring to FIG. 7, the zone managing device may display zone information 700, which is not limited to, not only a zone number, a zone class, a zone housekeeping status, a check-in status, a reservation status, and features but also the energy efficiency level of the zone determined by the zone managing device.

Figure 8:
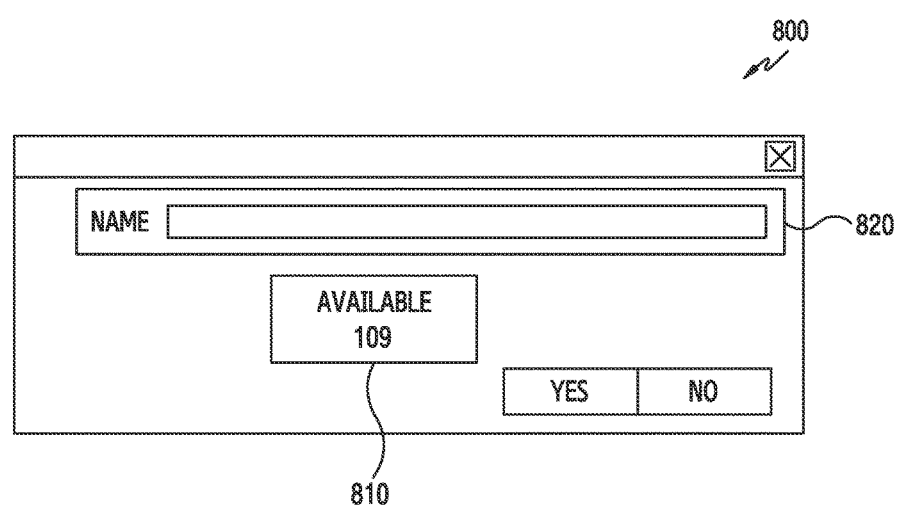
FIG. 8 illustrates a zone assignment screen of a zone managing device according to an embodiment of the present disclosure.

FIG. 8 illustrates a zone assignment screen of a zone managing device according to an embodiment of the present disclosure.

Referring to FIG. 8, in a zone assignment screen 800, the zone managing device may display an available zone (e.g., available room 109) 810 according to a name 820 of a user, and the manager may arrange the displayed information based on a particular condition and assign the user the most appropriate zone meeting the condition among the arranged zones.

FIGS. 9A to 9D illustrate zone assignments of a zone managing device based on an energy efficiency level according to an embodiment of the present disclosure.

FIG. 9A illustrates a list of energy efficiencies per zone before the arrangement.

Referring to FIG. 9A, in a list 910 of energy efficiencies per zone, the zone managing device defines the energy efficiency level of each zone and then display the energy efficiency levels of the zones. The zone managing device may display the energy efficiency levels of the zones by applying a different color to each level.

FIG. 9B illustrates a list of energy efficiencies per zone after the arrangement.

Referring to FIG. 9B, in a list 920 of energy efficiencies per zone, the zone managing device may arrange the zones based on the energy efficiency level in an ascending or descending order. The zone managing device may not only arrange the zones but also adjust the number of the zones.

FIG. 9C illustrates filtered zones based on the number of reserved zones.

Referring to FIG. 9C, in filtered zones 930 based on the number of reserved zones, the zone managing device may filter the zones based on the energy efficiency level. According to the manager settings, the zone managing device may filter and display the zones from the highest efficiency to the number of the reserved zones in the list arranged in the descending order of the energy efficiency level.

Referring to FIG. 9D, the zone managing device may assign a zone 940 according to a user characteristic. For example, when a business guest stays at a hotel in a regular pattern, it is easy to control the zone. Hence, the zone may be controlled based on the pattern by assigning a zone of a low energy efficiency level. A tourist guest stays at a hotel in an irregular pattern, so the zone control may be required. For example, since the tourist guest enters and leaves the zone irregularly and frequently turns the air conditioner on and off, it is advantageous to assign a zone of high energy efficiency. As such, it is advantageous to assign the tourist guest the zone of the high energy efficiency and the business guest the zone of the low energy efficiency.

The zone managing device may assign a low energy efficiency zone to a user going out for a long time because he/she tends to use the zone less than a user going out for a while, and assign a high energy efficiency zone to the user going out for a while.

Figure 10:
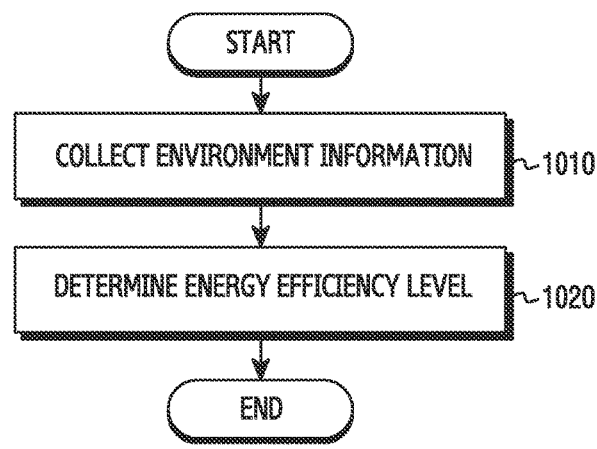
FIG. 10 illustrates a zone management method of a zone managing device according to an embodiment of the present disclosure.

FIG. 10 is a flowchart of a zone management method of a zone managing device according to an embodiment of the present disclosure.

Referring to FIG. 10, in operation 1010, the zone managing device determines the energy level. The zone managing device receives environment information from the sensors of each zone.

In operation 1020, the zone managing device determines the energy efficiency based on the received environment information, determines the energy level of each zone based on the determined energy efficiency, and displays the energy level of the zones. The zone managing device may confirm the reservation and then display, arrange, and filter the list of the available zones based on a preset condition by considering the user information, the zone feature information, and the zone energy efficiency. Based on the displayed zone list, the manager may assign the zone to the user. The zone managing device may assign the zone to the user based on the preset priority by considering the user information, the zone information, and the energy efficiency, without traversing the manager.

Although not illustrated, the zone managing device manages the zone. The zone managing device may control the zone of the user based on the user information pre-input. For example, the zone managing device may adjust the current temperature to a user's desired temperature according to the input user information, control lighting at a user's desired intensity, or open and close a curtain according to a user's preference.

When the user assigned the zone requests zone reassignment, the zone managing device may display the zone list to the user and guide the user to select an energy efficient zone by limiting and prioritizing available zones based on the energy efficiency.

Figure 11:
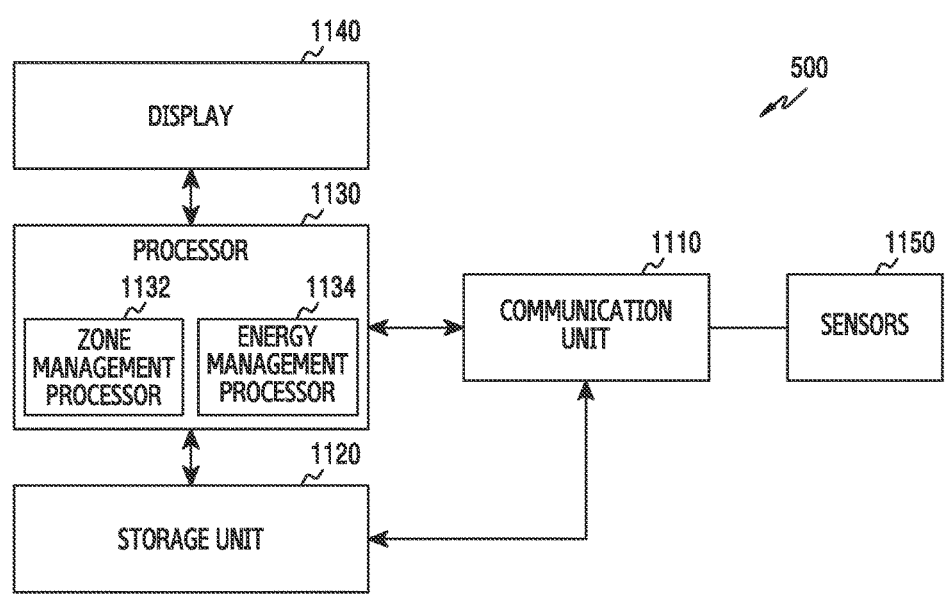
FIG. 11 illustrates a zone managing device according to an embodiment of the present disclosure.

FIG. 11 is a block diagram of a zone managing device according to an embodiment of the present disclosure.

Referring to FIG. 11, the zone managing device 500 includes a communication unit 1110, a storage unit (e.g., memory) 1120, a processor 1130, a display 1140, and at least one sensor 1150. The processor 1130 includes an energy management processor 1132 and a zone management processor 1134.

The communication unit 1110 transmits and receives signals. In particular, the communication unit 1110 may process communication between the sensor 1150 and the processor 1130, communication between the processor 1130 and the storage unit 1120, and communication between the processor 1130 and the display 1140 in each zone. The communication unit 1110 transmits reservation information to a user equipment. Here, the reservation information may include at least one user name and at least one room number. The communication unit 1110 may be referred to as a transmitter, a receiver, or a transceiver.

The storage unit 1120 stores a basic program for operating the zone managing device 500 for the energy efficiency, an application program, and data such as setting information. In particular, the storage unit 1120 may collect environment information for each of zones from the sensor 1150 and store the environment information and the energy efficiency information. The storage unit 1120 provides the stored data according to a request of the processor 1130. For example, the storage unit 1120 may transmit the environment information and the energy efficiency information to the processor 1130. The processor 1130 controls functions of the zone managing device 500 based on the energy efficiency. The processor 1130 includes the energy management processor 1132 and the zone management processor 1134. For example, the energy management processor 1132 and the zone management processor 1134 control the zone managing device 500 to execute the methods of FIGS. 3, 4, and 10 for the energy efficiency. The processor 1130 operates as follows.

The processor 1130 calculates the energy efficiency per zone using the values received from the sensors of the zones. The received values may include electricity consumption, an air temperature of the cooling and heating device, the fan speed of the cooling and heating device, an operating time of the cooling and heating device, a desired temperature of the room thermostat, and an actual room temperature record of each zone. The processor 1130 may arrange the zone information using the calculated energy efficiency, the user information, and the zone status information, prioritize the zones according to the arrangement, and control the display 1140 to display the results.

The display 1140 receives the information from the processor 1130 and display the information on a hardware screen. For example, the display 1140 displays the zone list and the zone features on the screen, based on the zone management information from the controller 1130.

Figure 12:
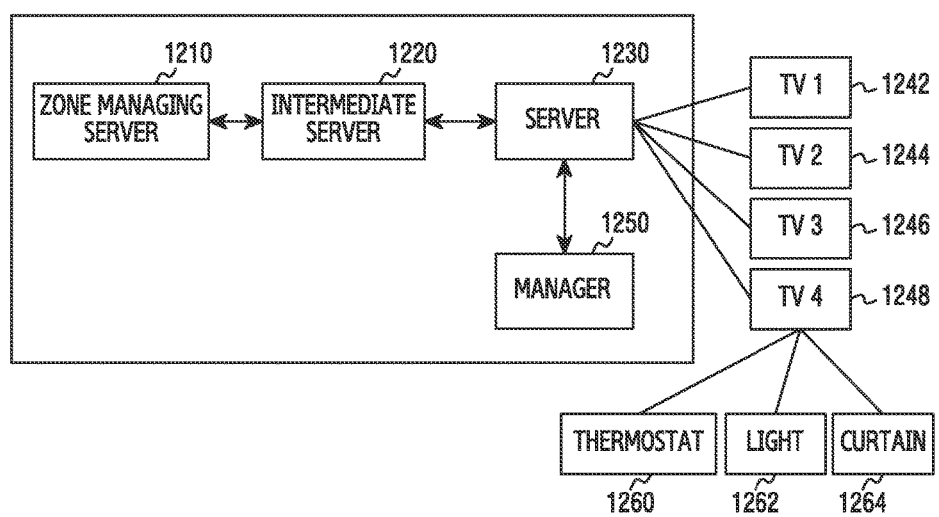
FIG. 12 illustrates zone control of a zone managing device according to an embodiment of the present disclosure.

FIG. 12 illustrates zone control of a zone managing device according to an embodiment of the present disclosure.

Referring to FIG. 12, the zone managing device 500 may control televisions (TVs) 1242, 1244, 1246 and 1248 by controlling a server 1230 via an intermediate server 1220 and a zone managing server 1210, or directly controlling the server 1230. By controlling the TVs 1242, 1244, 1246 and 1248, the zone managing server 1210 may provide information to the user, display a welcoming message to the user, or display a user's favorite channel. By controlling the TVs 1242, 1244, 1246 and 1248, the zone managing device 500 may control devices connected to the TVs 1242, 1244, 1246 and 1248. For example, the devices include a thermostat 1260, a light 1262, and a curtain 1264 in the zone based on the user preference. The functions may be controlled by the manager 1250 via the server 1230, as well as the zone managing server 1210.

Figure 13A:
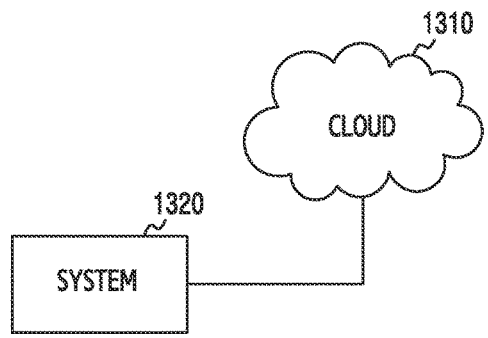
FIGS. 13A, 13B, and 13C illustrate at least one embodiment using a zone managing device according to an embodiment of the present disclosure.
Figure 13B:
Figure 13C:
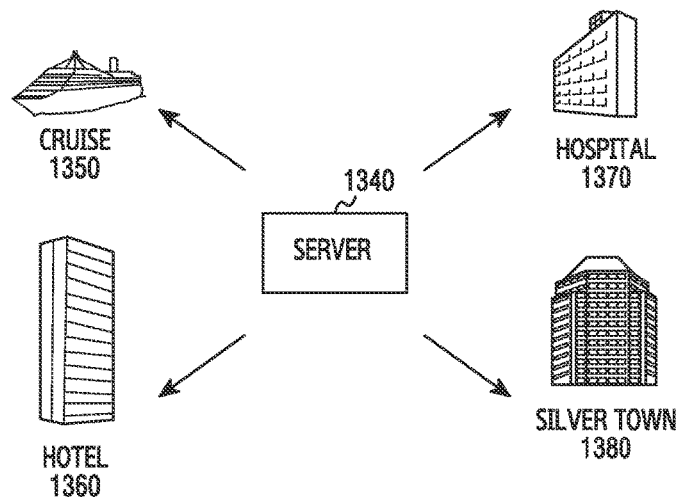

FIGS. 13A to 13C illustrate at least one embodiment using a zone managing device according to an embodiment of the present disclosure.

Referring to FIG. 13A, a zone management service is provided using a cloud 1310. The zone managing device may provide the service by controlling a system 1320 via not only a local server but also a server of the cloud 1310.

Referring to FIG. 13B, a zone management service is provided using a portable terminal 1330 (e.g., a user equipment). The zone managing device may provide information to the portable terminal 1330 by communicating with the portable terminal 1330, provide a mobile key service through the portable terminal 1330, and provide a zone control function through the portable terminal 1330. For example, when the user is assigned a zone but wants to a different zone, the zone managing device may provide the zone information based on the energy efficiency, to the user.

Referring to FIG. 13C, a zone management service is provided for a business-to-business (B2B) service. The zone managing device may be applied to a cloud server 1340 and the manager may remotely control the zone. The cloud based service may be applied to B2B hospitality accommodations, and the service may be applied to more various structures, for example, a cruise ship 1350, a hotel 1360, a hospital 1370, and a silver town 1380.

As set forth above, the zone management system assigns first the zone of the high efficiency in the zone assignment based on the zone energy efficiency, thus saving the cooling and heating energy.

According to various embodiments of the present disclosure, at least some of the devices or methods according to various embodiment of the present disclosure as defined by the appended claims and/or disclosed herein is implemented in the form of hardware, software, firmware, or any combination (e.g., module or unit) of at least two of hardware, software, and firmware. The module is the smallest unit of an integrated component or a part thereof and is also the smallest unit that performs various embodiments of the present disclosure or a part thereof. The module is mechanically or electronically implemented.

If implemented in software, a computer-readable storage medium (or storage medium readable by a computer) storing at least one program (or programming module) is provided. The software may, for example, be implemented by instructions stored in a computer-readable storage medium in the form of a programming module. The at least one program includes instructions that cause the electronic device to perform the methods according to various embodiments of the present disclosure as defined by the appended claims and/or disclosed herein.

The computer-readable storage medium includes magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a ROM, a random access memory (RAM), and a flash memory; an electrically erasable programmable ROM (EEPROM); a magnetic disc storage device; any other type of optical storage device; and a magnetic cassette. Alternatively, any combination of some or all forms a memory in which the program is stored. Further, a plurality of such memories may be included in the electronic device.

In addition, the program is stored in an attachable storage device capable of accessing the electronic device through a communication network such as the Internet, an intranet, a local area network (LAN), a wide LAN (WLAN), a storage area network (SAN), or any combination thereof. Such a storage device accesses the electronic device via an external port. Further, a separate storage device on the communication network accesses a portable electronic device. Any of the hardware devices as described above are configured to work as one or more software modules in order to perform the operations according to various embodiments of the present disclosure, and vice versa.

Any of the modules or programming modules according to various embodiments of the present disclosure includes at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for managing a plurality of rooms, the apparatus comprising:
   a memory;
   a communication module; and
   a processor operatively connected to the memory and the communication module, the processor being configured to:
      receive, from an external device, a first signal requesting an allocation of a room from among the plurality of rooms,
      in response to receiving of the first signal, transmit, to each of a plurality of sensors with which each of the plurality of rooms is equipped, a second signal requesting environment information,
      receive, from each of the plurality of sensors, the environment information for each of the plurality of rooms, identify, from among the plurality of rooms, the room for being allocated to a user of the external device, based on the received environment information and a priority associated with an energy efficiency level of each of the plurality of rooms, and transmit, to the external device, allocation information indicating that the identified room is allocated to the user of the external device, wherein the environment information is acquired by each of the plurality of sensors.

2. The apparatus of claim 1, wherein the energy efficiency level indicates energy consumed per unit temperature to maintain a set-point temperature in the identified room.

3. The apparatus of claim 1, wherein the environment information comprises at least one of a temperature, a desired temperature, an air temperature, a fan speed, or operating information of a cooling and heating device located at each of the plurality of rooms.

4. The apparatus of claim 1, wherein the processor is further configured to determine the energy efficiency level for each of the plurality of rooms.

5. The apparatus of claim 4,
wherein the processor is further configured to determine the energy efficiency level based on the environment information for each of the plurality of rooms, and
wherein the environment information is received during a preset time period.

6. The apparatus of claim 5, wherein the processor is further configured to apply a weight value to the environment information based on the preset time period and the room corresponded to the environment information, from among each of the plurality of rooms.

7. The apparatus of claim 1, wherein the processor is further configured to prioritize each of the plurality of rooms based on the energy efficiency level.

8. The apparatus of claim 1,
wherein the allocation information is used, by the external device, to activate a mobile key, and
wherein the mobile key is a key to enter the identified room based on the allocation information.

9. The apparatus of claim 1,
wherein each of the plurality of rooms comprises at least one of a television (TV), a curtain, a temperature regulator, and a lighting device, and
wherein the allocation information is used, by the external device, to control the at least one of the TV, the curtain, the temperature regulator, and the lighting device based on the allocation information.

10. The apparatus of claim 1, wherein the processor is further configured to allocate the identified room to a user according to a characteristic of the user and the energy efficiency level.

11. The apparatus of claim 10,
wherein the characteristic of the user comprises a zone use pattern, and
wherein the processor is further configured to:
allocate a user of a regular zone use pattern a zone of the energy efficiency level lower than a setting value, and
assign a user of an irregular zone use pattern a zone of the energy efficiency level higher than the setting value.

12. The apparatus of claim 11, wherein the user of the regular zone use pattern comprises a user defined as a business guest, and the user of the irregular zone use pattern comprises a user defined as a tourist.

13. The apparatus of claim 1, further comprising:
a display configured to display the energy efficiency level for each of the plurality of rooms.

14. The apparatus of claim 13,
wherein the display is further configured to display a list regarding the energy efficiency level for each of the plurality of rooms, and
wherein the list is arranged based on at least one of the energy efficiency level, user information, and room information.

15. The apparatus of claim 13, wherein the processor is further configured to:
determine a difference between an energy efficiency level determined at a first time point and an energy efficiency level determined at a second time point at one of the rooms of the plurality of rooms, and
display an alarm if the difference exceeds a setting value.

16. A method for managing a plurality of rooms, the method comprising:
receiving, from an external device, a first signal requesting an allocation of a room from among the plurality of rooms;
in response to receiving of the first signal, transmit, to each of a plurality of sensors with which each of the plurality of rooms is equipped, a second signal requesting environment information;
receiving, from each of the plurality of sensors, the environment information for each of the plurality of rooms;
identifying, from among the plurality of rooms, the room for being allocated to a user of the external device, based on the received environment information and a priority associated with an energy efficiency level of each of the plurality of rooms; and
transmitting, to the external device, allocation information indicating that the identified room is allocated to the user of the external device,
wherein the environment information is acquired by each of the plurality of sensors.

17. The method of claim 16, wherein the energy efficiency indicates energy consumed per unit temperature to maintain a set-point temperature in the identified room.

18. The method of claim 16, wherein the environment information comprises at least one of a temperature, a desired temperature, an air temperature, a fan speed, or operating information of a cooling and heating device located at each of the plurality of rooms.

19. The method of claim 16, wherein identifying of the environment information comprises determining the energy efficiency level for each of the plurality of rooms.

20. The method of claim 19, further comprising:
determining the energy efficiency level based on the environment information for each of the plurality of rooms,
wherein the environment information is received during a preset time period.

21. The method of claim 20, wherein the determining of the energy efficiency level comprises applying a weight value to the environment information based on the preset time period and the room corresponded to the environment information, from among each of the plurality of rooms.

22. The method of claim 16, further comprising prioritizing each of the plurality of rooms based on the energy efficiency level of each room of the plurality of rooms.

23. The method of claim 16,
wherein the allocation information is used, by the external device, to activate a mobile key, and wherein the mobile key is a key to enter the identified room based on the allocation information.

24. The method of claim 23,
wherein each of the plurality of rooms comprises at least one of a television (TV), a curtain, a temperature regulator, and a lighting device, and
wherein the allocation information is used, by the external device, to control the at least one of the TV, the curtain, the temperature regulator, and the lighting device based on the allocation information.

25. The method of claim 16, further comprising allocating at least one of a plurality of zones to a user according to a characteristic of the user and the energy efficiency level.

26. The method of claim 25,
wherein the allocating of the at least one of the plurality of zones comprises:
    allocating a user of a regular zone use pattern a zone of the energy efficiency level lower than a setting value, and
    allocating a user of an irregular zone use pattern a zone of the energy efficiency level higher than the setting value, and
wherein the characteristic of the user comprises a zone use pattern.

27. The method of claim 26, wherein the user of the regular zone use pattern comprises a user defined as a business guest, and the user of the irregular zone use pattern comprises a user defined as a tourist.

28. The method of claim 16, further comprising displaying the energy efficiency level for each room of the plurality of rooms.

29. The method of claim 28, further comprising:
displaying a list regarding the energy efficiency level for each of the plurality of rooms,
wherein the list is arranged based on at least one of the energy efficiency level, user information, and room information.

30. The method of claim 28, further comprising:
determining a difference between an energy efficiency level determined at a first time point and an energy efficiency level determined at a second time point at one of the plurality of rooms; and
displaying an alarm if the difference exceeds a setting value.

31. A non-transitory computer readable storage medium with a computer program stored thereon, the computer program executed by at least one processor to perform the method of claim 16.

* * * * *